(12) United States Patent
Aida et al.

(10) Patent No.: US 11,817,133 B2
(45) Date of Patent: Nov. 14, 2023

(54) MAGNETIC DISK DEVICE STORED TRACE DATA OF THE READ/WRITE PROCESSING

(71) Applicants: Kabushiki Kaisha Toshiba, Tokyo (JP); Toshiba Electronic Devices & Storage Corporation, Tokyo (JP)

(72) Inventors: Kimiyasu Aida, Kawasaki Kanagawa (JP); Kazuya Takada, Chigasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/652,984

(22) Filed: Mar. 1, 2022

(65) Prior Publication Data

US 2023/0078768 A1  Mar. 16, 2023

(30) Foreign Application Priority Data

Sep. 15, 2021 (JP) .................. 2021-150270

(51) Int. Cl.
| | |
|---|---|
| *G11B 5/02* | (2006.01) |
| *G11B 5/55* | (2006.01) |
| *G06F 3/06* | (2006.01) |
| *G11B 20/18* | (2006.01) |
| *G11B 27/36* | (2006.01) |

(52) U.S. Cl.
CPC .............. *G11B 5/02* (2013.01); *G06F 3/0604* (2013.01); *G06F 3/0656* (2013.01); *G06F 3/0676* (2013.01); *G11B 5/5573* (2013.01); *G11B 27/36* (2013.01); *G11B 2020/1826* (2013.01); *G11B 2220/2508* (2013.01)

(58) Field of Classification Search
None
See application file for complete search history.

(56) References Cited

U.S. PATENT DOCUMENTS

| | | | |
|---|---|---|---|
| 7,274,525 B2 | 9/2007 | Takano | |
| 10,504,551 B1* | 12/2019 | Kitamura et al. | ... G11B 5/5578 |
| 10,839,840 B2 | 11/2020 | Takada et al. | |
| 2008/0010484 A1 | 1/2008 | Ohta et al. | |
| 2022/0084547 A1* | 3/2022 | Nishida | ................ G11B 5/5573 |

\* cited by examiner

*Primary Examiner* — Craig A. Renner
(74) *Attorney, Agent, or Firm* — Knobbe, Martens, Olson & Bear, LLP

(57) ABSTRACT

According to one embodiment, a magnetic disk device incudes a first magnetic disk, a first actuator that reads/writes data from/to the first magnetic disk, a first controller that controls the first actuator, a second magnetic disk, a second actuator that reads/writes data from/to the second magnetic disk, a second controller that controls the second actuator, wherein the first controller executes read/write processing, and the second controller stores trace data of the read/write processing when the first controller executes the read/write processing.

5 Claims, 3 Drawing Sheets

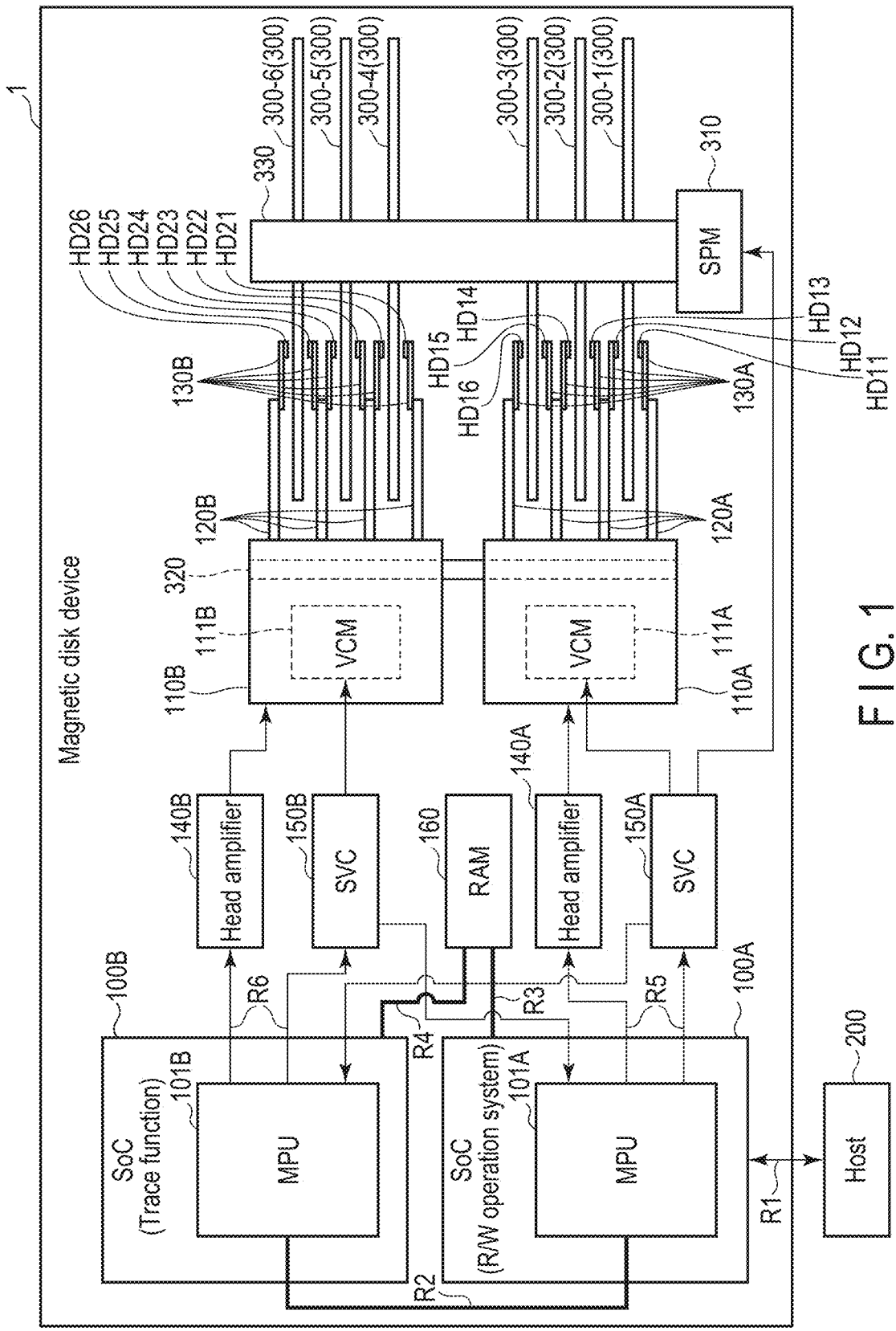
F I G. 1

| Character | Description |
|---|---|
| First | K28.5 control character (for primitives defined in this standard) or K28.3 control character (for primitives defined by SATA) |
| Second | Constant data character |
| Third | Constant data character |
| Last | Constant data character |

MAGNETIC DISK DEVICE STORED TRACE DATA OF THE READ/WRITE PROCESSING

CROSS-REFERENCE TO RELATED APPLICATIONS

This application is based upon and claims the benefit of priority from Japanese Patent Application No. 2021-150270, filed Sep. 15, 2021, the entire contents of which are incorporated herein by reference.

FIELD

Embodiments described herein relate generally to a magnetic disk device.

BACKGROUND

There is a case where a magnetic disk device fails for some reason during use. In such a case, in order to investigate the cause of the failure, an expensive bus analyzer is attached to the magnetic disk device for investigation.

When the bus analyzer is attached to the magnetic disk device as described above, a signal quality on the interface changes by attaching the bus analyzer, which may cause the error phenomenon not being able to be reproduced. When the above situation occurs, the cause of the failure of the magnetic disk device cannot be investigated even though the expensive bus analyzer is used.

In addition, depending on the customer, there is a case where entry to the installation place of the magnetic disk device is blocked for security reasons. In the above case, the bus analyzer cannot be attached at the time of conducting the inspection.

Furthermore, there is a case where the magnetic disk device stores Self-Monitoring Analysis and Reporting Technology (SMART) information in which the magnetic disk device itself stores its own health state. In the case of the above magnetic disk device, it is also conceivable to read the SMART information from the failed magnetic disk device to investigate the cause of the failure. However, the content of the SMART information is specifically limited information such as error information and the number of times of error occurrence. For this reason, it has been difficult to identify the cause of the failure that has occurred due to a trouble on the interface between a host and the magnetic disk device.

An object of embodiments is to provide a magnetic disk device that can investigate a cause of a failure at low cost.

BRIEF DESCRIPTION OF THE DRAWINGS

FIG. 1 is a diagram illustrating an example of a configuration of a magnetic disk device according to an embodiment.

DETAILED DESCRIPTION

Figure 2:
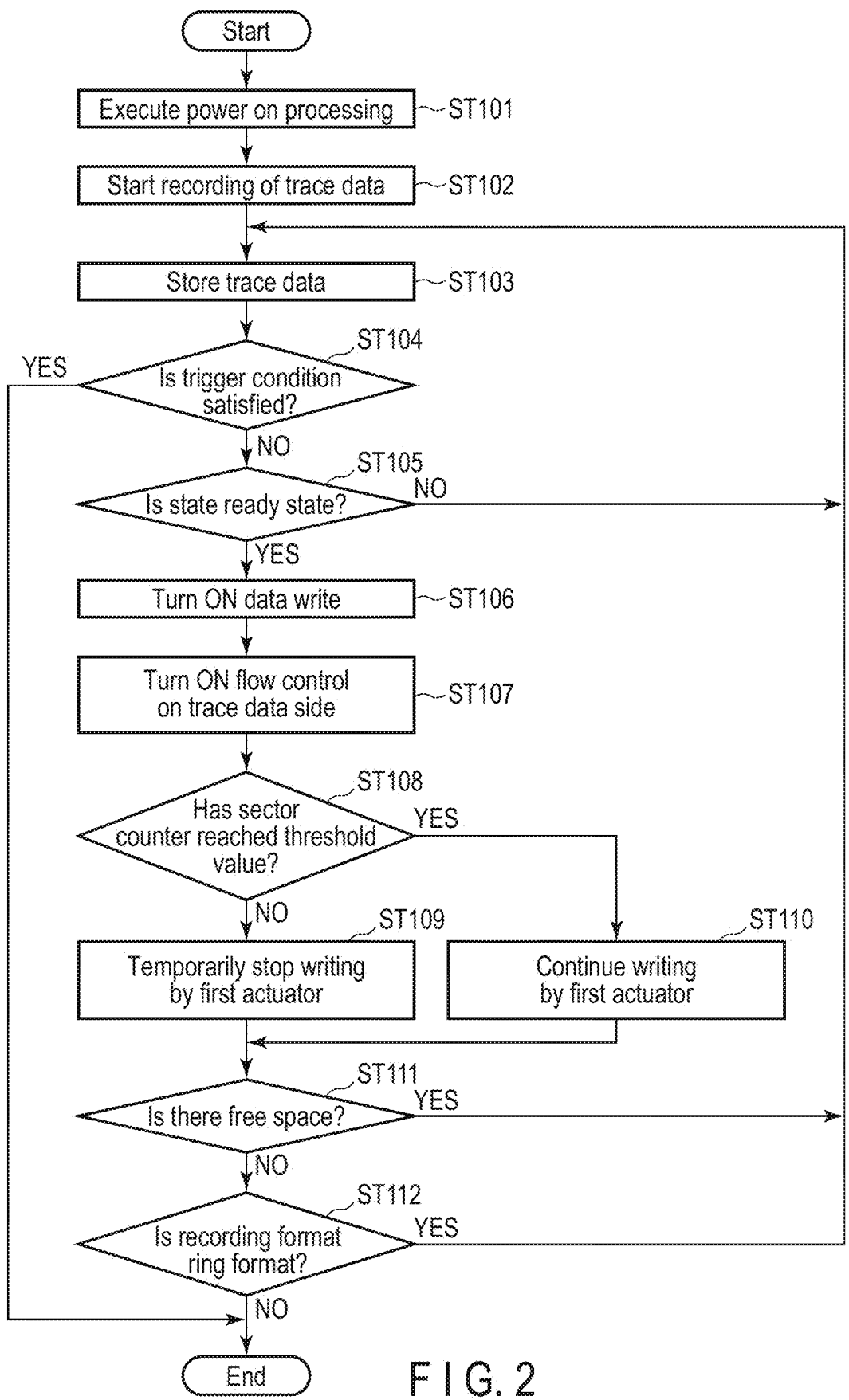
FIG. 2 is a flowchart illustrating an example of processing when a read command or a write command according to the embodiment is received.

Embodiments will be described hereinafter with reference to the accompanying drawings.

In general, according to one embodiment, a magnetic disk device includes: a first magnetic disk; a first actuator that reads/writes data from/to the first magnetic disk; a first controller that controls the first actuator; a second magnetic disk; a second actuator that reads/writes data from/to the second magnetic disk; a second controller that controls the second actuator, wherein the first controller executes read/write processing, and the second controller stores trace data of the read/write processing when the first controller executes the read/write processing.

It is noted that the disclosure is presented by way of example only, and those skilled in the art should understand that matters which can be changed as appropriate without departing from the spirit of the disclosure and which could easily be conceived of naturally fall within the scope of the present disclosure. Further, for clarity of explanation, the drawings may be schematically illustrated in width, thickness, shapes, and the like of components, as compared with actual implementation. However, the drawings are presented by way of example only and are not intended to limit understanding of the present disclosure. Furthermore, in the specification and the drawings, elements similar to those already described with reference to the drawings are denoted by the same reference signs, and detailed description thereof is omitted as appropriate.

Embodiment

FIG. 1 is a diagram illustrating an example of a configuration of a magnetic disk device 1 according to an embodiment.

As illustrated in FIG. 1, the magnetic disk device 1 includes a system-on-chip (SoC: first control unit) 100A, an SoC (second control unit) 100B, voice coil motor (VCM) units 110A, 110B, four actuators 120A, 120B, four suspensions 130A, 130B, head amplifiers 140A, 140B, servo combo (SVC) 150A, 150B, random access memory (RAM) 160, a magnetic disk 300, a spindle motor (SPM) 310, a shaft 320, and a shaft 330. The SoC 100A is configured to be able to communicate with a host (host computer) 200 and the SoC 100B.

In the present embodiment, the magnetic disk 300 includes six magnetic disks 300-1 to 300-6 (which are collectively referred to as 300). The magnetic disk 300 is fixed to the shaft 330. The shaft 330 is provided in the SPM 310, and rotates in synchronization with rotation of the SPM 310. As a result, the magnetic disk 300 is also configured to rotate in synchronization with the rotation of the SPM 310.

The four actuators (first actuators) 120A are provided at predetermined intervals so as to be alternately stacked on the magnetic disks (first magnetic disks) 300-1 to 300-3. The four actuators 120A are fixed to the VCM unit 110A. Furthermore, magnetic heads HD11 to HD16 are provided at the tips of the four suspensions 130A and on a surface facing a disk surface, respectively. As a result, both surfaces of the three magnetic disks 300-1 to 300-3 have any of the magnetic heads HD11 to HD16 positioned thereon.

The four actuators (second actuators) 120B are configured similarly to the four actuators 120A. That is, the four actuators 120B are provided at predetermined intervals so as to be alternately stacked on the magnetic disks (second magnetic disks) 300-4 to 300-6. In addition, the four actuators 120B are fixed to the VCM unit 110B. Furthermore, magnetic heads HD21 to HD26 are provided at the tips of the four suspensions 130B and on a surface facing the disk surface. As a result, both surfaces of the three magnetic disks 300-4 to 300-6 have any of the magnetic heads HD21 to HD26 positioned thereon.

The VCM unit 110A and the VCM unit 110B include a voice coil motor (VCM) 111A and a VCM 111B, respectively. When the VCM 111A operates, the VCM unit 110A rotates, and the actuators 120A fixed to the VCM unit 110A also rotates together with the VCM unit. As a result, the magnetic heads (HD11 to HD16) provided at the tips of the suspensions 130A can be positioned at predetermined positions on the magnetic disks 300-1 to 300-3. In addition, when the VCM 111B operates, the VCM unit 110B rotates, and the actuators 120B fixed to the VCM unit 110B also rotates together with the VCM unit. As a result, the magnetic heads (HD21 to HD26) provided at the tips of the suspensions 130B can be positioned at predetermined positions on the magnetic disks 300-4 to 300-6.

The SoC 100A is a chip incorporated with a microprocessor (MPU) 101A, and a read/write channel and a hard disk controller which are not illustrated. In addition, similarly to the SoC 100A, the SoC 100B is a chip incorporated with a microprocessor (MPU) 101B, and a read/write channel and a hard disk controller which are not illustrated. The MPU 101A and the MPU 101B are connected by a bus line (a path R2 to be described later). The SoC 100A and the SoC 100B are connected to not illustrated memories, respectively. The memory includes a non-volatile memory and a volatile memory.

The MPU 101A of the SoC 100A is a controller of the magnetic disk device 1, and executes control of read/write operations with respect to the magnetic disks 300-1 to 300-3 and servo control necessary for positioning the magnetic heads HD11 to HD16. The read/write channel is a signal processing circuit that processes a signal related to reading/writing. The hard disk controller controls writing of data to the magnetic disks 300-1 to 300-3 and reading of data from the magnetic disks 300-1 to 300-3 via the magnetic heads HD11 to HD16, the head amplifier 140A, the read/write channel, and the MPU 101A.

The MPU 101B of the SoC 100B is a controller of the magnetic disk device 1, and executes control of read/write operations for the magnetic disks 300-4 to 300-6. The read/write channel is a signal processing circuit that processes a signal related to reading/writing. The hard disk controller controls writing of data to the magnetic disks 300-4 to 300-6 and reading of data from the magnetic disks 300-4 to 300-6 via the magnetic heads HD21 to HD26, the head amplifier 140B, the read/write channel, and the MPU 101B. Trace data to be described later is stored in the magnetic disks 300-4 to 300-6.

The head amplifier 140A supplies a write signal (write current) corresponding to the write data R5 supplied from the read/write (R/W) channel included in the SoC 100A to the magnetic heads HD11 to HD16. In addition, the head amplifier 140A amplifies the read signal output from the magnetic heads HD11 to HD16 and transmits the amplified read signal to the RAY channel included in the SoC 100A. The head amplifier 140B supplies a write signal (write current) corresponding to the write data R6 supplied from the R/W channel included in the SoC 100B to the magnetic heads HD21 to HD26. In addition, the head amplifier 140B amplifies the read signal output from the magnetic heads HD21 to HD26 and transmits the amplified read signal to the R/W channel included in the SoC 100B.

The SVC 150A executes servo control necessary for positioning the magnetic heads HD11 to HD16 under the control of the MPU 101A. The SVC 150A transmits servo control information to the MPU 101B. The SVC 150B executes servo control necessary for positioning the magnetic heads HD21 to HD26 under the control of the MPU 101B. The SVC 150B transmits servo control information to the MPU 101A.

The RAM 160 is a volatile memory that functions as a buffer memory when flow control is executed. The RAM 160 is connected to the SoC 100A and the SoC 100B, respectively. Here, in the flow control, a counter of the number of sectors is provided for each data segment of the RAM 160 functioning as a buffer memory, data is developed in the RAM 160, and a signal is notified when the counter reaches a threshold value. When read transfer is notified as the signal, the transfer of the read data to the host 200 is started without passing through the firmware, and the subsequent data from the magnetic disk 300 is read into the RAM 160. In addition, when write transfer is notified as the signal, this means control in which a command (for example, XFER_RDY) is transmitted to the host 200 without passing through the firmware, and write data received from the host 200 is developed in the RAM 160 and written as it is from the RAM 160 to the magnetic disk 300. In the present embodiment, the flow control is also executed when trace data is written from the RAM 160 to the magnetic disks 300-4 to 300-6.

The host 200 is a higher-level device of the magnetic disk device 1. The host 200 transmits commands such as a read command and a write command to the magnetic disk device, and receives such as read data and a processing result from the magnetic disk device 1. The host 200 is connected to the SoC 100A by an interface of a serial attached SCSI (Serial Attached Small computer system interface, SAS) or serial ATA (Serial Advanced Technology Attachment, SATA) standard.

As described above, the magnetic disk device 1 is configured to be able to independently perform the processing performed by the MPU 101A on the magnetic disks 300-1 to 300-3 and the processing performed by the MPU 101B on the magnetic disks 300-4 to 300-6. That is, the magnetic disk device 1 is a magnetic disk device having a so-called multi-actuator. Therefore, the magnetic disk device 1 can execute different types of processing of two systems. In the present embodiment, the case when the SoC 100A executes the read/write processing in the magnetic disk device and when the SoC 100B executes the processing of storing trace data of read/write processing executed by the SoC 100A is described.

For example, when a write command is received from the host 200, the write command is transmitted to the SoC 100A via a path R1. When the write command is received, the write command is transmitted from the MPU 101A in the SoC 100A to the MPU 101B in the SoC 100B via the path R2. In addition, the write command is transmitted to the RAM 160 via a path R3 and held in the RAM 160. When the write processing of the write command held in the RAM 160 is performed, the content of the write processing is transmitted to the MPU 101A via the path R3 to execute the write processing and is transmitted to the MPU 101B via a path R4. A bus constituting the path R4 is a bus line of a dedicated bus provided for storing trace data. The MPU 101A controls the head amplifier 140A and the SVC 150A to execute the write processing on the magnetic disks 300-1 to 300-3 based on the contents of the write processing. In addition, the MPU 101B controls the head amplifier 140B and the SVC 150B to execute the write processing of writing the contents of the write processing (trace data) to the magnetic disks 300-4 to 300-6.

Next, processing when the magnetic disk device receives a read command or a write command from the host is described. FIG. 2 is a flowchart illustrating an example of processing when a read command or a write command is received. Note that the processing is executed after not-illustrated power is applied to the magnetic disk device 1.

First, the MPU 101A executes power-on processing (ST101). Here, the power-on processing is processing of initializing a buffer memory used in the flow control. In the present embodiment, the RAM 160 is initialized, and trigger conditions, filter conditions, and others described later are read into the RAM 160 from a not-illustrated non-volatile memory. For example, in the investigation of command timeout, the filter condition can be set so as to filter out ALIGN (used for speed adjustment of link rate) and NOTIFY (motor activation instruction) in Primitive. Numbers of ALIGN and NOTIFY continue to be transmitted on the IF. Therefore, by setting these as filter conditions, the storage area of the trace data can be saved.

Next, the MPU 101B starts recording of the trace data (ST102). Then, the MPU 101B stores the trace data (ST103). However, because the spindle motor 310 and others are not still in the ready state, the MPU 101B does not store the trace data in the magnetic disks 300-4 to 300-6 but holds the trace data in a ring format on the RAM 160.

Figure 3:
FIG. 3 is a diagram illustrating an example of definition of a command "Primitive" according to the embodiment.

In this state, the MPU 101A determines whether or not the trigger condition is satisfied (ST104). For example, in a case of desiring to investigate a timeout error of a command transmitted by the host 200 side, the host 200 side transmits a task frame (Task Frame: ABORT TASK, etc.) to the magnetic disk device 1 in order to abort (Abort) the command, and transmits a command (HARD_RESET Primitive) if the command is still not responded. In the case of the above configuration, it is conceivable to use (HARD_RESET Primitive) as the trigger condition. FIG. 3 is a diagram illustrating an example of a definition T of a command "Primitive".

If the trigger condition is determined to be satisfied (ST104: YES), the MPU 101A ends this processing. On the other hand, if the trigger condition is determined not to be satisfied (ST104: NO), the MPU 101B determines whether the spindle motor 310 and others are in the ready state (ST105). If the state is determined not to be the ready state (ST105: NO), the process returns to step ST103.

If the state is determined to be the ready state (ST105: YES), the MPU 101A turns ON the data write (ST106). As a result, the MPU 101A writes data to the magnetic disks 300-1 to 300-3. In the present embodiment, the case of data writing is described, but the same applies to a case of data reading.

Next, the MPU 101A turns ON the flow control on the trace data side (ST107). As a result, the flow control of the MPU 101B is executed. Next, the MPU 101A monitors the RAM 160 and determines whether or not the sector counter has reached a threshold value (ST108). If the sector counter is determined not to have reached the threshold value (ST108: NO), the MPU 101A temporarily stops writing by the actuator (first actuator) 120A (ST109). This is because there is no trace data to be written from the RAM 160 to the predetermined area of the magnetic disks 300-4 to 300-6. If the sector counter is determined to have reached the threshold value (ST108: YES), the MPU 101A continues writing by the actuator (first actuator) 120A (ST110). Because there is still the trace data to be written from the RAM 160 to the predetermined area of the magnetic disks 300-4 to 300-6, the flow control is continued.

Next, the MPU 101B determines whether there is a free space (ST111). Specifically, it is determined whether there is a free area for storing the trace data in the magnetic disks 300-4 to 300-6. If it is determined that there is a free space (ST111: YES), the processing returns to step ST103. As a result, the processing of steps ST103 to ST110 described above is repeated, and the trace data is stored.

On the other hand, if the MPU 101B determines that there is no free space (ST111: NO), the MPU 101B determines whether the recording format is the ring format (ST112). If the recording format is determined to be the ring format (ST112: YES), the processing returns to step ST103. As a result, the processing of steps ST103 to ST110 described above is repeated, and the trace data is stored. If the MPU 101B determines that the recording format is not the ring format (ST112: NO), the processing ends.

According to the magnetic disk device 1 configured as described above, the SoC 100A executes the read/write processing, and when the SoC 100A executes the read/write processing, the SoC 100B stores the trace data of the read/write processing. Therefore, when a failure occurs in the magnetic disk device 1, an operator can investigate what kind of failure has occurred in the magnetic disk device by checking and analyzing the trace data stored in the magnetic disk 300. Therefore, the cause of the failure in the magnetic disk device 1 can be investigated at low cost without requiring an expensive bus analyzer.

In addition, in the magnetic disk device 1, the failure of the interface not at the command level but in units of "Primitive" positioned below the layer of the command level can be analyzed. Therefore, the failure in the magnetic disk device 1 can be investigated in more detail.

Furthermore, the magnetic disk device 1 is configured to separately operate the actuators 120A that reads/write data from/to the magnetic disks 300-1 to 300-3 and the actuators 120B that write trace data to the magnetic disks 300-4 to 300-6. Therefore, when the trace data is written, the magnetic disk device 1 does not need to stop the flow control of data transfer based on read/write. Therefore, the magnetic disk device 1 can write the trace data to the magnetic disks 300-1 to 300-3 without affecting the I/O throughput performance.

Furthermore, in the above embodiment, the case where the SoC 100A and the host 200 are connected by the interface based on the SAS or SATA standard has been described, but the present invention is not limited thereto. For example, the technology of the above embodiment can also be applied in a case where the SoC 100A and the host 200 are connected based on the regulation of Non-Volatile Memory Express (NVMe).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a first magnetic disk;
a first actuator that reads/writes data from/to the first magnetic disk;
a first controller that is configured to communicate with a host computer and control the first actuator according to a command received from the host computer;
a second magnetic disk;

a second actuator that reads/writes data from/to the second magnetic disk;

a second controller that controls the second actuator according to the command transferred from the first controller, and a buffer memory connected to the first controller and the second controller;

wherein when the command is received from the host computer, the first controller stores control content based on the command in the buffer memory and transfers the command to the second controller, and when the first controller controls the first actuator based on the command, the second controller acquires the control content of the first controller based on the command from the buffer memory, and stores an acquired processing content in the second magnetic disk as trace data.

2. The magnetic disk device according to claim 1, wherein the first controller and the second controller are connected via a first bus line for transmitting the command.

3. The magnetic disk device according to claim 1, wherein the buffer memory is connected with the first controller via a second bus line for transmitting the control content of the first controller based on the command, and the buffer memory is connected with the second controller via a third bus line for transmitting the stored control content of the first controller.

4. The magnetic disk device according to claim 1, wherein the second controller stores the trace data in the second magnetic disk by flow control.

5. The magnetic disk device according to claim 4, wherein the trace data is stored in the second magnetic disk in a primitive unit.

* * * * *